US012065342B2

(12) United States Patent
Yoshida et al.

(10) Patent No.: US 12,065,342 B2
(45) Date of Patent: Aug. 20, 2024

(54) MOVABLE BODY, METHOD FOR CONTROLLING MOVABLE BODY, AND NON-TRANSITORY COMPUTER READABLE STORAGE MEDIUM STORING PROGRAM

(71) Applicant: MITSUBISHI HEAVY INDUSTRIES, LTD., Tokyo (JP)

(72) Inventors: Yuji Yoshida, Tokyo (JP); Tetsuhei Kobayashi, Tokyo (JP); Kazuma Otaka, Tokyo (JP); Hiroyasu Aruga, Tokyo (JP); Hiroto Akitaya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 250 days.

(21) Appl. No.: 17/686,963

(22) Filed: Mar. 4, 2022

(65) Prior Publication Data

US 2022/0281727 A1 Sep. 8, 2022

(30) Foreign Application Priority Data

Mar. 8, 2021 (JP) ................................ 2021-036260

(51) Int. Cl.
*B66F 9/075* (2006.01)
*B66F 9/06* (2006.01)

(52) U.S. Cl.
CPC .......... *B66F 9/07568* (2013.01); *B66F 9/063* (2013.01); *B66F 9/07586* (2013.01)

(58) Field of Classification Search
CPC .. B66F 9/07568; B66F 9/063; B66F 9/07586; B66F 9/07572; H04W 4/80
See application file for complete search history.

(56) References Cited

U.S. PATENT DOCUMENTS 11,414,152 B2 * 8/2022 Krinkin ................ B62K 11/007
2020/0164737 A1 * 5/2020 Kozlenok ............ G05D 1/0293
2020/0393839 A1 12/2020 Hasegawa et al.
2022/0048747 A1 * 2/2022 Li ........................... H04W 4/80

FOREIGN PATENT DOCUMENTS

AT 523117 A1 * 5/2021 ............. B62D 7/026
CN 101687620 A * 3/2010 ........... B62D 7/1509
JP 11-59474 3/1999
JP 2004-348678 12/2004
JP 2020-200154 12/2020

OTHER PUBLICATIONS

Notice of Reasons for Refusal dated Jan. 30, 2024 in corresponding Japanese Patent Application No. 2021-036260, with English-language translation.

* cited by examiner

*Primary Examiner* — George C Jin
(74) *Attorney, Agent, or Firm* — WENDEROTH, LIND & PONACK, L.L.P.

(57) ABSTRACT

A movable body is a tricyclic movable body automatically moving and includes: a first steering wheel steerable but not drivable; a second steering wheel steerable but not drivable and provided on a side in a first direction with respect to the first steering wheel; and a drive wheel steerable and drivable and provided on a side in a second direction orthogonal to the first direction with respect to the first steering wheel and the second steering wheel.

7 Claims, 9 Drawing Sheets

NORMAL TURN MODE

MOVABLE BODY, METHOD FOR CONTROLLING MOVABLE BODY, AND NON-TRANSITORY COMPUTER READABLE STORAGE MEDIUM STORING PROGRAM

CROSS-REFERENCE TO RELATED APPLICATIONS

This application claims the benefit of priority to Japanese Patent Application Number 2021-036260 filed on Mar. 8, 2021. The entire contents of the above-identified application are hereby incorporated by reference.

TECHNICAL FIELD

The disclosure relates to a movable body, a method for controlling a movable body, and a non-transitory computer readable storage medium storing a program.

RELATED ART

There have been known movable bodies which automatically move. In each of such movable bodies, normally, two wheels on a front side are steerable in the same direction and are not driven, and two wheels on a back side are driven and are not steerable. In addition, for example, JP 2004-348678 A describes an omnidirectional movable carriage in which four wheels are driven and steerable.

SUMMARY

However, a turn radius of the movable body in which only the two wheels on the front side are steerable in the same direction is increased upon changing an orientation thereof. In addition, there is a demand for a further simple configuration for the omnidirectional movable carriage in which the four wheels are driven and are steerable, due to a reason that a structure thereof becomes large-sized, a reason that it is required to mutually synchronize the driven wheels, and other reasons. Therefore, it is required to appropriately turn with a simple configuration.

The present disclosure solves the above-described problems, and an object of the present disclosure is to provide a movable body which can appropriately turn with a simple configuration, a method for controlling a movable body, and a non-transitory computer readable storage medium storing a program.

SUMMARY OF THE INVENTION

In order to solve the above-described problems and to achieve the object, a movable body according to the present disclosure is a tricyclic movable body automatically moving and includes: a first steering wheel which is steerable but is not drivable; a second steering wheel which is steerable but not drivable and provided on a side in a first direction with respect to the first steering wheel; and a drive wheel which is steerable and drivable and provided on a side in a second direction orthogonal to the first direction with respect to the first steering wheel and the second steering wheel.

In order to solve the above-described problems and to achieve the object, a method for controlling a movable body according to the present disclosure which is a tricyclic movable body automatically moving and includes a first steering wheel which is steerable but not drivable, a second steering wheel which is steerable but not drivable and provided on a side in a first direction with respect to the first steering wheel, and a drive wheel which is steerable and drivable and provided on a side in a second direction orthogonal to the first direction with respect to the first steering wheel and the second steering wheel, the method includes: a step of acquiring, when the movable body moves while changing an orientation from a first travel direction to a second travel direction, viewed from a vertical direction, mode information indicating whether selected is a normal turn mode in which the movable body is moved while permitting a rotation center of the movable body being out of a vehicle body region, the vehicle body region being defined as a region extending along the first travel direction and occupied by the movable body, or a special turn mode in which the movable body is moved with the rotation center of the movable body being located within the vehicle body region; and a step of moving, by controlling steering of at least one of the first steering wheel, the second steering wheel, and the drive wheel and by controlling driving of the drive wheel, the movable body in a mode indicated by the mode information while changing the orientation.

In order to solve the above-described problems and to achieve the object, a non-transitory computer readable storage medium storing a program according to the present disclosure causes a computer to execute a method for controlling a movable body which is a tricyclic movable body automatically moving and includes a first steering wheel which is steerable but is not drivable, a second steering wheel which is steerable but not drivable and provided on a side in a first direction with respect to the first steering wheel, and a drive wheel which is steerable and drivable and provided on a side in a second direction orthogonal to the first direction with respect to the first steering wheel and the second steering wheel, and the non-transitory computer readable storage medium storing the program causes the computer to execute: a step of acquiring, when the movable body is moved while changing an orientation from a first travel direction to a second travel direction, viewed from a vertical direction, mode information indicating whether selected is a normal turn mode in which the movable body is moved while permitting a rotation center of the movable body being out of a vehicle body region, the vehicle body region being defined as a region extending along the first travel direction and occupied by the movable body, or a special turn mode in which the movable body is moved with the rotation center of the movable body being located within the vehicle body region; and a step of moving, by controlling steering of at least one of the first steering wheel, the second steering wheel, and the drive wheel and by controlling driving of the drive wheel, the movable body in a mode indicated by the mode information while changing the orientation.

According to the present disclosure, appropriate turning can be made with a simple configuration.

BRIEF DESCRIPTION OF DRAWINGS

The disclosure will be described with reference to the accompanying drawings, wherein like numbers reference like elements.

DESCRIPTION OF EMBODIMENTS

Preferred embodiments of the disclosure will be described in detail below with reference to the accompanying drawings. Note that the disclosure is not limited to these embodiments, and, when there are a plurality of embodiments, the disclosure is intended to include a configuration combining these embodiments.

First Embodiment

Movable Body

Figure 1:
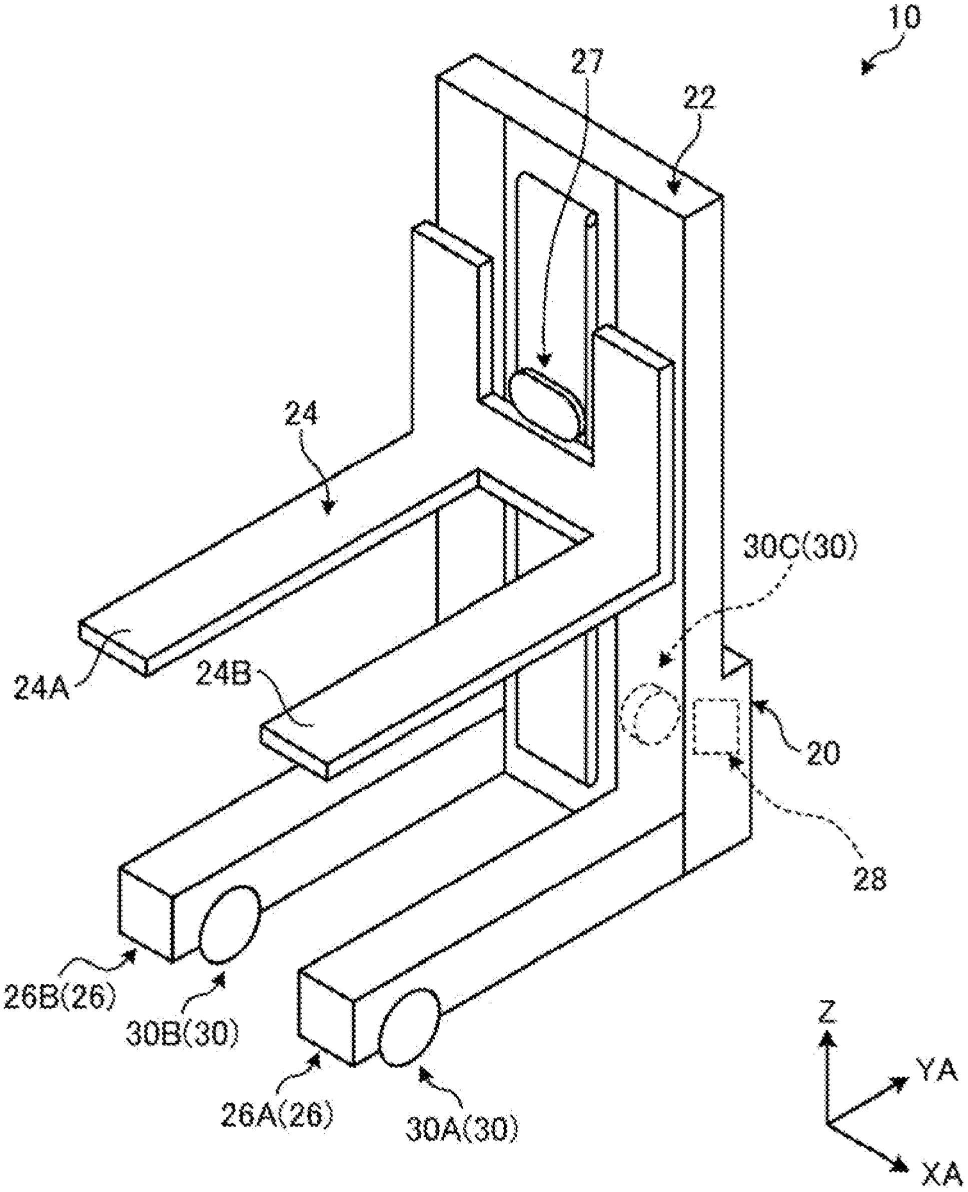
FIG. 1 is a schematic view of a configuration of a movable body.

FIG. 1 is a schematic view of a configuration of a movable body. A movable body 10 according to a first embodiment is an apparatus which can automatically move. In the present embodiment, the movable body 10 is a forklift and further, is the so-called automated guided forklift (AGF). As illustrated in FIG. 1, the movable body 10 includes a vehicle body 20, a mast 22, a fork 24, straddle legs 26, a sensor 27, a control device 28, and wheels 30. Here, the straddle legs 26 are provided in end portions of the vehicle body 20 on one side in a front-back direction. Hereinafter, in the front-back direction, a direction on a side in which the straddle legs 26 are not provided is defined as a direction YA and a direction on one side in a left-right direction which is orthogonal to the front-back direction is defined as a direction XA. The straddle legs 26 are a pair of shaft-like members which protrude from the vehicle body 20 to a side in a direction opposite to the direction YA. Hereinafter, in a case where the pair of straddle legs 26 are distinguished, the straddle leg 26 on a side in the direction XA is referred to as a straddle leg 26A and the straddle leg 26 on a side in a direction opposite to the direction XA is referred to as a straddle leg 26B. The mast 22 is attached to the straddle legs 26 in a movable manner and moves in the direction YA and on the side in the direction opposite to the direction YA. The mast 22 extends along an up-down direction (herein, a direction Z) which is orthogonal to the direction XA and the 5 direction YA. The fork 24 is attached to the mast 22 so as to be movable in the direction Z. The fork 24 may be attached to the mast 22 so as to be movable also in the direction XA. The fork 24 has a pair of tines 24A and 24B. The tines 24A and 24B extend, from the mast 22, toward the front direction of the vehicle body 20. The tines 24A and 24B are arranged separated from each other in the lateral direction of the mast 22.

The sensor 27 detects a position and an attitude of a target object by detecting (receiving) a reflected light from the target object and the periphery therearound. Furthermore, the sensor 27 is a sensor which radiates light and more specifically, the sensor 27 radiates laser beam as the light. By detecting the reflected light of the radiated laser beam, the sensor 27 detects the position and the attitude of the target object. By radiating the laser beam while scanning in one direction, the sensor 27 detects the position and the attitude of the target object from the reflected light of the radiated laser beam. In other words, it can also be said that the sensor 27 is the so-called 2D-light detection and ranging (LiDAR). In the present embodiment, the sensor 27 performs scanning by the laser beam in a horizontal direction, that is, a direction orthogonal to the direction Z. However, the sensor 27 is not limited to the above-described sensor and only required to detect the target object by employing any method, and for example, the sensor 27 may be the so-called 3D-LiDAR which scans in a plurality of directions or may be a camera. In addition, the position where the sensor 27 is attached may be any position and the number of the sensor 27 may be any number.

The control device 28 controls movement of the movable body 10. The control device 28 will be described later.

Wheels

The movable body 10 has a first steering wheel 30A, a second steering wheel 30B, and a drive wheel 30C as the wheels 30.

First Steering Wheel

The first steering wheel 30A is a wheel which is steerable but not drivable. Being drivable herein refers to, for example, being autonomously rotatable by motive power from a drive source, with the wheel connected to the drive source such as a motor. Accordingly, the first steering wheel 30A is a wheel which does not autonomously rotate. However, in conjunction with autonomous rotation of the later-described drive wheel 30C and movement of the movable body 10 along therewith and in synchronization with the rotation of the drive wheel 30C, the first steering wheel 30A rotates. In addition, steering herein refers to an orientation of a wheel (rotation angle) being changeable with respect to the movable body 10 (vehicle body 20), viewed from the direction Z. Accordingly, the orientation of the first steering wheel 30A with respect to the movable body 10 can be changed.

Figure 2:
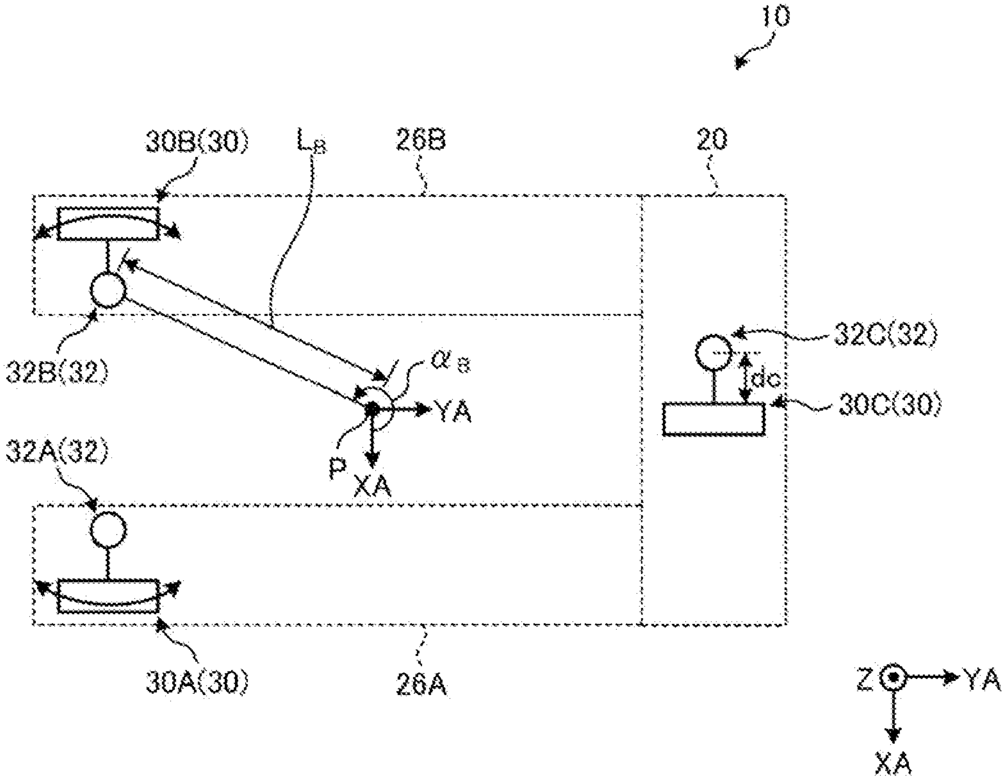
FIG. 2 is a schematic view in which wheels are viewed from a top surface.

FIG. 2 is a schematic view in which the wheels are viewed from a top surface. By being steered, the first steering wheel 30A moves in a circumferential direction in a case where the direction Z is an axial direction, thereby changing the orientation thereof. More specifically, as illustrated in FIG. 2, the first steering wheel 30A is connected to a rotor shaft 32A which is provided in a position away from the first steering wheel 30A, viewed from the direction Z. By being steered, the first steering wheel 30A rotates with the rotor shaft 32A as a rotation center, thereby changing the orientation thereof. However, the rotation center of the first steering wheel 30A is not limited to the position away from the first steering wheel 30A and for example, the first steering wheel 30A may be rotatable with a center position of the first steering wheel 30A as a center, viewed from the direction Z.

In the present embodiment, the first steering wheel 30A is attached to the straddle leg 26A and more specifically, is attached in a tip portion of the straddle leg 26A (a portion on a side opposite to the direction YA). However, the position in the movable body 10, where the first steering wheel 30A is attached, is not limited to the straddle leg 26A and may be any position.

Second Steering Wheel

The second steering wheel 30B is a wheel which is steerable but not drivable. In other words, although the second steering wheel 30B is a wheel which does not autonomously rotate, in conjunction with the autonomous rotation of the later-described drive wheel 30C and movement of the movable body 10 along therewith and in synchronization with the rotation of the drive wheel 30C, the second steering wheel 30B rotates. In addition, the orientation of the second steering wheel 30B with respect to the movable body 10 can be changed. By being steered, the second steering wheel 30B moves in a circumferential direction in a case where the direction Z is an axial direction, thereby changing the orientation thereof. More specifically, as illustrated in FIG. 2, the second steering wheel 30B is connected to a rotor shaft 32B which is provided in a position away from the second steering wheel 30B, viewed from the direction Z. By being steered, the second steering wheel 30B rotates with the rotor shaft 32B as a rotation center, thereby changing the orientation thereof. However, the rotation center of the second steering wheel 30B is not limited to the position away from the second steering wheel 30B and for example, the second steering wheel 30B may be rotatable with a center position of the second steering wheel 30B as a center, viewed from the direction Z.

In the movable body 10, the second steering wheel 30B is provided on the side in the direction (first direction) opposite to the direction XA, in which the first steering wheel 30A is provided. In the present embodiment, the second steering wheel 30B is provided side by side with the first steering wheel 30A along the direction XA. In other words, a position of the second steering wheel 30B in the direction YA (second direction) overlaps with a position of the first steering wheel 30A in the direction YA. However, the position of the second steering wheel 30B in the direction YA (second direction) is not limited thereto and may be any position, and the position thereof may be deviated from the position of the first steering wheel 30A in the direction YA. In addition, in the present embodiment, the second steering wheel 30B is attached to the straddle leg 26B and more specifically, is attached in a tip portion of the straddle leg 26B (a portion on the side opposite to the direction YA). However, an attachment position of the second steering wheel 30B in the movable body 10 is not limited to the straddle leg 26B and may be any position.

Drive Wheel

The drive wheel 30C is a wheel which is drivable and steerable. In other words, the drive wheel 30C is a wheel which can autonomously rotate, and the orientation thereof with respect to the movable body 10 can be changed. By being steered, the drive wheel 30C moves in a circumferential direction in a case where the direction Z is an axial direction, thereby changing the orientation thereof. More specifically, as illustrated in FIG. 2, the drive wheel 30C is connected to a rotor shaft 32C which is provided in a position away from the drive wheel 30C, viewed from the direction Z. By being steered, the drive wheel 30C rotates with the rotor shaft 32C as a rotation center, thereby changing the orientation thereof. However, the rotation center of the drive wheel 30C is not limited to the position away from the drive wheel 30C, and for example, the drive wheel 30C may be rotatable with a center position of the drive wheel 30C as a center, viewed from the direction Z.

In the movable body 10, the drive wheel 30C is provided on a side in the direction YA (second direction) with respect to the first steering wheel 30A and the second steering wheel 30B. In the present embodiment, the drive wheel 30C is provided in a position between the first steering wheel 30A and the second steering wheel 30B (herein, a midpoint position) in the direction (first direction) along the direction XA. However, the position of the drive wheel 30C in the direction (first direction) along the direction XA is not limited thereto and may be any position, and the position thereof is not limited to the position between the first steering wheel 30A and the second steering wheel 30B. In addition, the drive wheel 30C is attached to the vehicle body 20 and more specifically, is attached in a tip portion of the vehicle body 20 (a portion on a side in the direction YA). However, an attachment position of the drive wheel 30C in the movable body 10 is not limited to the vehicle body 20 and may be any position.

As described above, the movable body 10 in the present embodiment is a tricyclic movable body in which the first steering wheel 30A, the second steering wheel 30B, and the drive wheel 30C are provided and no other wheel or wheels is or are provided. However, the configuration and the number of the wheels 30 which the movable body 10 has are not limited thereto. The movable body 10 has a plurality of wheels whose number may be any number and all of the wheels are steerable, at least one of the wheels may be steerable and drivable, and the positions of the wheels may also be any positions.

Control Device

Figure 3:
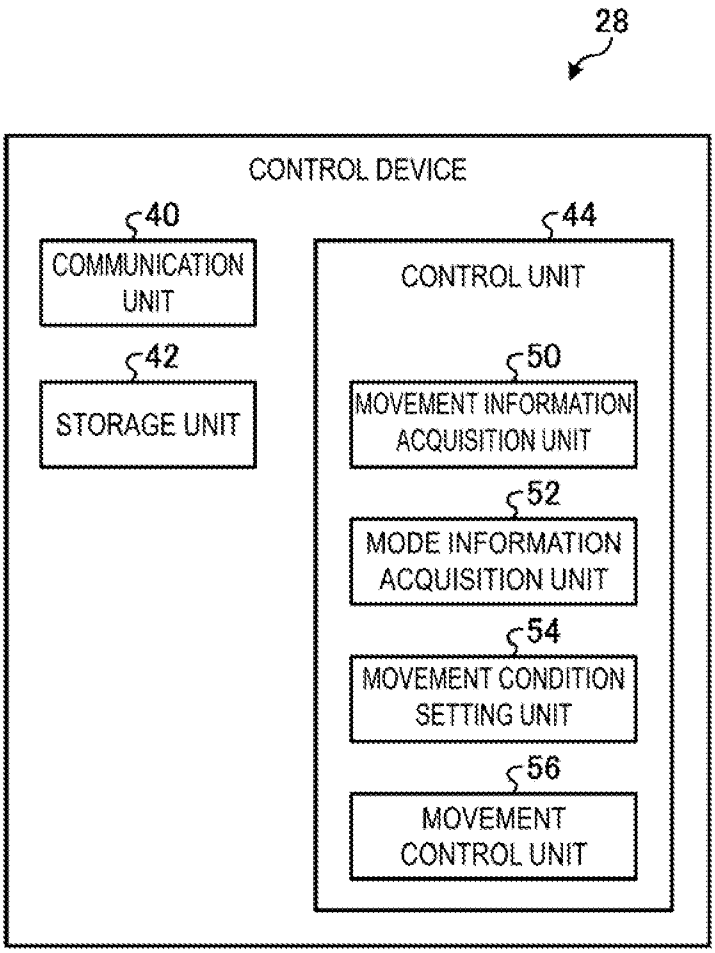
FIG. 3 is a schematic block diagram of a control device of the movable body.

Next, the control device 28 of the movable body 10 will be described. FIG. 3 is a schematic block diagram of the control device of the movable body. The control device 28 controls the movable body 10. By controlling the steering of the first steering wheel 30A and the second steering wheel 30B and the steering and driving of the drive wheel 30C, the control device 28 moves the movable body 10. The control device 28 is a computer and as illustrated in FIG. 3, includes a communication unit 40, a storage unit 42, and a control unit 44. The communication unit 40 is used for the control unit 44, is a module which communicates with an external apparatus, and may include, for example, an antenna or the like. Although in the present embodiment, a communication method by the communication unit 40 is a wireless communication method, the communication method may be any communication method. The storage unit 42 is a memory which has stored therein a variety of information such as computing contents and a program of the control unit 44 and includes, for example, at least one of a random access memory (RAM), a main storage device such as a read only memory (ROM), and an external storage device such as a hard disk drive (HDD).

The control unit 44 is an arithmetic unit and includes, for example, an arithmetic circuit such as a central processing unit (CPU). The control unit 44 includes a movement information acquisition unit 50, a mode information acquisition unit 52, a movement condition setting unit 54, and a movement control unit 56. The control unit 44 reads out a program (software) from the storage unit 42 and executes the program, thereby realizing the movement information acquisition unit 50, the mode information acquisition unit 52, the movement condition setting unit 54, and the movement control unit 56 and executing processes of those units 50, 52, 54, and 56. Note that the control unit 44 may execute these processes by one CPU or may include a plurality of CPUs and may execute these processes by the plurality of CPUs. In addition, at least one part of the processes of the movement information acquisition unit 50, the mode information acquisition unit 52, the movement condition setting unit 54, and the movement control unit 56 may be realized by a hardware circuit. In addition, the program for the control unit 44, which the storage unit 42 has stored therein may be stored in a recording medium which the control device 28 can read.

Movement Information Acquisition Unit

The movement information acquisition unit 50 acquires movement information which is information pertinent to movement of the movable body 10. The movement information acquisition unit 50 acquires, as the movement information, the information of a target velocity of the movable body 10 and a target angular velocity Ω of the movable body 10. The target velocity is a target value of the migration velocity (translation velocity) of the movable body 10. In a case where the movable body 10 moves in a two-dimensional plane coordinate system in an X direction and a Y direction which is orthogonal to the X direction, the movement information acquisition unit 50 acquires a target velocity Vx indicating target values of an orientation of movement in the X direction and a migration velocity (that is, a vector and a scalar value) and a target velocity Vy indicating target values of an orientation of movement in the Y direction and a migration velocity (that is, a vector and a scalar value). In addition, the target angular velocity Ω is target values of a direction in which the orientation (a rotation angle) of the movable body 10 changes and a velocity at which the orientation changes, viewed from the direction Z (vertical direction) which is orthogonal to the X direction and the Y direction.

A method of acquiring the movement information (herein, the target velocities Vx and Vy and the target angular velocity Ω) by the movement information acquisition unit 50 may be any method. For example, a destination of the movable body 10 may be set, a path in which the movable body 10 moves may be set based on the destination, and the movement information may be set based on the set path. In this case, the control device 28 of the movable body 10 may set the path based on the set destination and may set the movement information based on the path. In addition, an apparatus which is different from the movable body 10 (for example, a ground system or the like) may set the path, and the control device 28 of the movable body 10 may receive information of the path from the apparatus and based on the received information of the path, may set the movement information. In addition, an apparatus which is different from the movable body 10 may set the movement information based on the path, and the control device 28 of the movable body 10 may receive the movement information from the apparatus. In addition, the movement information is not limited to being set based on the path, and for example, a worker may input the movement information by remote control. In this case, for example, a worker who is in a position away from the movable body 10 operates an input device for remotely controlling the movable body 10. Then, the input device sets the movement information based on operation contents made by the worker and transmits the movement information to the control device 28 of the movable body 10.

Mode Information Acquisition Unit

The mode information acquisition unit 52 acquires mode information. The mode information is information indicating a movement mode applied when the movable body 10 moves while changing the orientation from a first travel direction to a second travel direction. In other words, when moving while changing the orientation, the movable body 10 selects, as the movement mode to be used, a movement mode indicated in the mode information among a plurality of movement modes. In the present embodiment, the mode information acquisition unit 52 acquires, as the mode information, information indicating whether it is a normal turn mode or a special turn mode. Hereinafter, the normal turn mode and the special turn mode will be described. Note that hereinafter, a case where the movable body 10 moves while changing the orientation from the Y direction to the X direction will be described as an example. In other words, a case where the first travel direction before changing the orientation is the Y direction and the second travel direction after changing the orientation is the X direction will be described as an example. However, the first travel direction and the second travel direction are not limited to the Y direction and the X direction and may be any directions. In addition, although hereinafter, in the example, the movable body 10 moves, in the direction YA on a side opposite to the fork 24, as a travel direction side, in the front-back direction of the movable body 10, the disclosure is not limited thereto and the travel direction side may be a side of the fork 24 (the side opposite to the direction YA).

Normal Turn Mode

Figure 4:
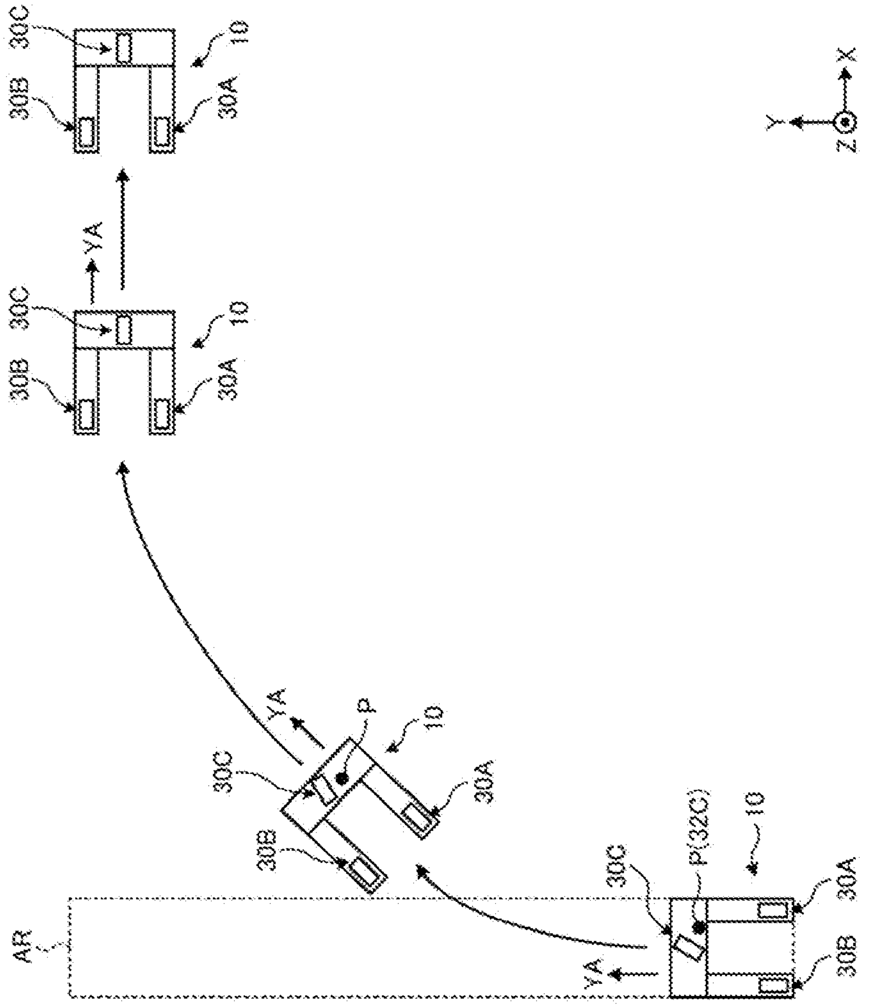
FIG. 4 is a schematic view illustrating an example of a normal turn mode.

FIG. 4 is a schematic view illustrating an example of the normal turn mode. The normal turn mode is a mode in which while the drive wheel 30C is being driven, without steering the first steering wheel 30A and the second steering wheel 30B, the drive wheel 30C is steered. In the example in FIG. 4, the drive wheel 30C is steered while being driven. In other words, the orientation is changed to a side in a direction in which the drive wheel 30C turns by steering while being rotated by driving. On the other hand, the first steering wheel 30A and the second steering wheel 30B are not steered and face a travel direction of the movable body 10. Note that also in a case where the side opposite to the direction YA is the travel direction, in the normal turn mode, the first steering wheel 30A and the second steering wheel 30B are not steered, the drive wheel 30C is steered, and the drive wheel 30C is driven. However, in the normal turn mode, the first steering wheel 30A and the second steering wheel 30B may be steered and the drive wheel 30C may be driven without steering the drive wheel 30C.

Furthermore, as illustrated in FIG. 4, viewed from the direction Z, a region occupied by the movable body 10 is extended along the first travel direction (herein, the Y direction) before changing the orientation and the extended region is defined as a vehicle body region AR. In addition, as a coordinate (a position) which is a rotation center (a rotor shaft) of the movable body 10 in the coordinate system (the two-dimensional coordinate system of the direction XA and the direction YA) of the movable body 10 viewed from the direction Z, a coordinate (position) represented by the two-dimensional plane coordinate system of the X direction and the Y direction is defined as a position of a rotation center P of the movable body 10. In the example in FIG. 4, since the drive wheel 30C is steered, the rotation center P is a position of the rotor shaft 32C. In this case, it can be said that the normal turn mode is a mode in which when the movable body 10 moves toward the first travel direction while changing the orientation from the first travel direction (herein, the Y direction) to the second travel direction (herein, the X direction), the movable body 10 is moved while it is being permitted that the position of the rotation center P of the movable body 10 is out of a range of the vehicle body region AR. In other words, in the normal turn mode, since only the drive wheel 30C is steered and the orientation is changed, there may be a case where a turn radius is increased and the rotation center P protrudes to the second travel direction side further than the vehicle body region AR.

Special Turn Mode

The special turn mode is a mode in which while the drive wheel 30C is driven, all the wheels 30, that is, the first steering wheel 30A, the second steering wheel 30B, and the drive wheel 30C herein are steered. Furthermore, the special turn mode is a mode in which when the movable body 10 moves toward the first travel direction while changing the orientation from the first travel direction to the second travel direction, the movable body 10 is moved while the position of the rotation center P of the movable body 10 is being located within the range of the vehicle body region AR. In other words, in the special turn mode, steering of all the wheels 30 is controlled, thereby maintaining the rotation center P within the vehicle body region AR and inhibiting the turn radius from being increased.

Quick Turn Mode

Figure 5:
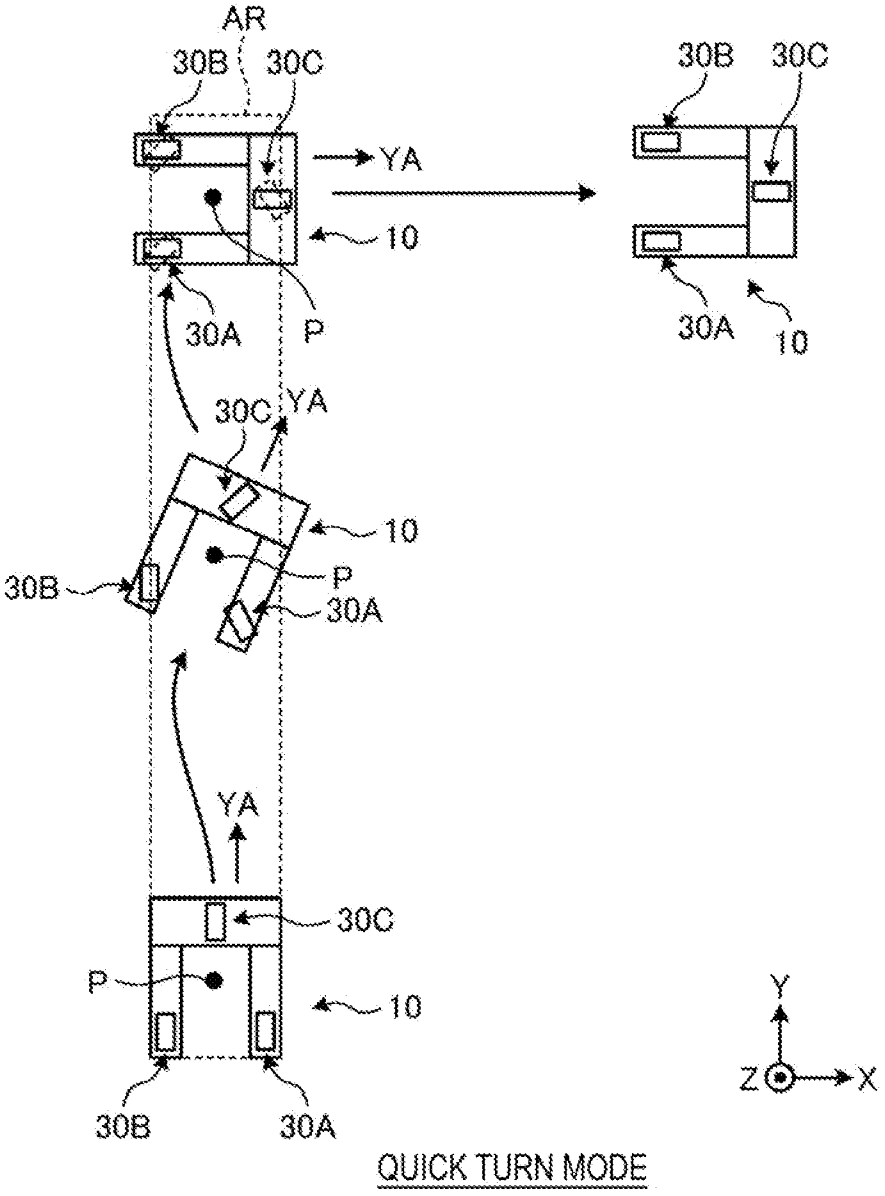
FIG. 5 is a schematic view illustrating an example of a quick turn mode.

FIG. 5 is a schematic view illustrating an example of a quick turn mode. In the first embodiment, as a special turn mode, the quick turn mode is included. The quick turn mode is a mode in which the movable body 10 is moved such that viewed from the direction Z, the rotation center P of the movable body 10 is a center position of wheels 30, that is, a center position among the first steering wheel 30A, the second steering wheel 30B, and the drive wheel 30C herein. The center position among the first steering wheel 30A, the second steering wheel 30B, and the drive wheel 30C refers to a position of a center of gravity of a triangle having apices, which are a position of the first steering wheel 30A, a position of the second steering wheel 30B, and a position of the drive wheel 30C. As illustrated in FIG. 5, in the quick turn mode, all the wheels 30 are steered while the drive wheel 30C is being driven, and while the rotation center P which is the center position among the first steering wheel 30A, the second steering wheel 30B, and the drive wheel 30C is located within the range of the vehicle body region AR, the orientation is switched from the first direction (Y direction) to the second direction (X direction) while moving toward the first direction (Y direction). In the quick turn mode, steering of all the wheels 30 is controlled, thereby maintaining the rotation center P within the vehicle body region AR and allowing a turn radius to be inhibited from being increased.

A method of acquiring the mode information (herein, information indicating whether it is the normal turn mode or the quick turn mode) by the mode information acquisition unit 52 may be any method. For example, a destination of the movable body 10 may be set, a path in which the movable body 10 moves may be set based on the destination, and the mode information may be set based on the set path. For example, for a path passing through a passage whose road width is narrower than a predetermined threshold value, the quick turn mode may be set, and for a path passing through a passage whose road width is at the threshold value or more, the normal turn mode may be set. The mode information acquisition unit 52 may set the mode information based on the path by itself, or an apparatus which is different from the movable body 10 may set the mode information based on the path and the mode information acquisition unit 52 may receive the mode information from the apparatus. In addition, the mode information is not limited to mode information set based on the path and for example, the mode information may be inputted by a worker by remote control. In this case, for example, a worker who is in a position away from the movable body 10 operates an input device for remotely controlling the movable body 10. Then, based on contents operated by the worker, the input device sets the mode information and transmits the mode information to the control device 28 of the movable body 10.

Movement Condition Setting Unit

The movement condition setting unit 54 sets movement conditions of the movable body 10 based on the mode information acquired by the mode information acquisition unit 52. Furthermore, in the present embodiment, the movement condition setting unit 54 sets the movement conditions of the movable body 10 based on the movement information acquired by the movement information acquisition unit 50 and the mode information acquired by the mode information acquisition unit 52. As the movement conditions, the movement condition setting unit 54 sets a steering angle command value of the wheel 30, that is, a steering angle command value of at least one of the first steering wheel 30A, the second steering wheel 30B, and the drive wheel 30C herein and a rotational speed command value of the drive wheel 30C. Since the steering angle refers to the orientation of the wheel 30, the steering angle command value refers to a command value of an orientation of the wheel 30. In addition, since the rotational speed refers to a speed at which the drive wheel 30C is rotated, the rotational speed command value refers to a command value of the speed at which the drive wheel 30C is rotated.

Setting of Movement Conditions in Normal Turn Mode

In a case where the mode information indicates the normal turn mode, based on the movement information acquired by the movement information acquisition unit 50, the movement condition setting unit 54 calculates a rotational speed command value of the drive wheel 30C and a steering angle command value of the drive wheel 30C under conditions of the normal turn mode. In other words, under conditions under which orientations of the first steering wheel 30A and the second steering wheel 30B are maintained on a travel direction side, the movement condition setting unit 54 calculates, as a rotational speed command value and a steering angle command value, a steering angle and a rotational speed of the drive wheel 30C which can realize the target velocities Vx and Vy and the target angular velocity A acquired by the movement information acquisition unit 50.

Setting of Movement Conditions in Quick Turn Mode

In a case where the mode information indicates the quick turn mode, based on the movement information acquired by the movement information acquisition unit 50, that is, based on the target velocities Vx and Vy and the target angular velocity Ω herein, under conditions of the quick turn mode, the movement condition setting unit 54 calculates a rotational speed command value of the drive wheel 30C and a steering angle command value of each of the wheels 30.

Specifically, in a case where the mode information indicates the quick turn mode, the movement condition setting unit 54 sets a center position among the first steering wheel 30A, the second steering wheel 30B, and the drive wheel 30C as a position of the rotation center P.

Then, based on the target velocities Vx and Vy and the target angular velocity Ω, the movement condition setting unit 54 calculates a steering angular velocity ωi for each of the wheels 30. Here, the steering angular velocity refers to an amount of change in a steering angle per unit time. In addition, i is a symbol which identifies each of the wheels 30, and in other words, in the example of the present embodiment, a steering angular velocity ωi refers to a steering angular velocity of the first steering wheel 30A, a steering angular velocity of the second steering wheel 30B, or a steering angular velocity of the drive wheel 30C. For example, by using Equation (1) below, the movement condition setting unit 54 calculates the steering angular velocity ωi.

$$\omega i = a\ \tan(\text{—}/{+Si}, +/{-Ci}) \tag{1}$$

Note that (—/+Si, +/−Ci) in Equation (1) means (−Si, +Ci) and (+Si, −Ci). In Equation (1), Si and Ci are those represented by Equations (2) and (3) below.

$$Si = Vx \cdot \sin\Theta - Vy \cdot \cos\Theta - \Omega \cdot Li \cdot \cos\alpha i \tag{2}$$

$$Ci = Vx \cdot \cos\Theta + Vy \cdot \sin\Theta - \cdot Li \cdot \sin\alpha i \tag{3}$$

Note that Θ is an orientation of the movable body 10 before changing the travel direction, viewed from the direction Z. In addition, Li is a distance between the rotation center P of the movable body 10 (herein, the center position among the first steering wheel 30A, the second steering wheel 30B, and the drive wheel 30C) and the rotor shaft 32 of the wheel 30, and in FIG. 2, a distance $L_B$ between the rotation center P of the movable body 10 and the rotor shaft 32B is illustrated as an example. In addition, αi is an angle formed between a line segment connecting the rotation center P of the movable body 10 with the rotor shaft 32 and one axis of the coordinate system of the movable body 10 (for example, the direction XA), and in FIG. 2, an angle $\alpha_B$ formed between a line segment the connecting the rotation center P with the rotor shaft 32B and the direction XA is illustrated as an example.

Based on the steering angular velocity ωi, the movement condition setting unit 54 calculates a steering angle command value Oi for each of the wheels 30. In the example of the present embodiment, the movement condition setting unit 54 calculates a steering angle command value Oi (t) at timing t as illustrated in Equation (4) below by feedback control.

$$\theta i(t)=\theta i(t-1)+\omega i\cdot\Delta t \tag{4}$$

Here, θi(t−1) is a steering angle command value Oi at timing (t−1) immediately before the timing t, and Δt is time from the timing t up to the timing (t−1).

The movement condition setting unit 54 calculates the steering angle command value θi for each of the wheels 30, that is, the first steering wheel 30A, the second steering wheel 30B, and the drive wheel 30C.

In addition, based on the target velocities Vx and Vy and the target angular velocity Ω, the movement condition setting unit 54 calculates a rotational speed command value ωc of the drive wheel 30C. In the example of the present embodiment, the movement condition setting unit 54 calculates a rotational speed command value $\omega_{dC}$ of the drive wheel 30C by using Equation (5) below.

$$\omega_{dC}=\{(\pm(A+B)^{0.5}+d_e\cdot w_c)+d_e\cdot\omega_c\}/R_e \tag{5}$$

Note that A and B are represented by Equations (6) and (7) below. As illustrated in FIG. 2, $d_c$ is a distance from the rotor shaft 32C up to the drive wheel 30C. A symbol $\omega_c$ represents the steering angle command value of the drive wheel 30C.

$$A=Vx^2+Vy^2+(\Omega\cdot L_c)^2 \tag{6}$$

$$B=-2\cdot Vx\cdot\Omega\cdot L_c\sin(\Theta+\alpha_c)+2\cdot Vy\cdot\Omega\cdot L_c\cdot\cos(\Theta+\alpha_c) \tag{7}$$

Note that $L_c$ is a distance between the rotation center P of the movable body 10 and the rotor shaft 32C and $\alpha_c$ is an angle formed between a line segment connecting the rotation center P with the rotor shaft 32C and the direction XA.

The movement condition setting unit 54 sets the movement conditions as described above.

Movement Control Unit

The movement control unit 56 controls steering of at least one of the wheels 30, that is, at least one of the first steering wheel 30A, the second steering wheel 30B, and the drive wheel 30C and controls driving of the drive wheel 30C, thereby moving the movable body 10. The movement control unit 56 controls the steering of the wheel 30 and the driving thereof under the movement conditions set by the movement condition setting unit 54.

In a case where it is the normal turn mode, the movement control unit 56 controls a rotational speed and a steering angle of the drive wheel 30C so as to attain the rotational speed command value of the drive wheel 30C and the steering angle command value of the drive wheel 30C which are set by the movement condition setting unit 54. Thus, while it is being permitted that the position of the rotation center P of the movable body 10 is out of the range of the vehicle body region AR, in accordance with the normal turn mode, the movable body 10 moves toward the first travel direction while changing the orientation from the first travel direction to the second travel direction.

On the other hand, in a case where it is the quick turn mode, the movement control unit 56 controls the rotational speed of the drive wheel 30C and the steering angle of each of the wheels 30 so as to attain the rotational speed command value $\omega_{dC}$ of the drive wheel 30C and the steering angle command value θi of each of the wheels 30, which are set by the movement condition setting unit 54. Thus, while the position of the rotation center P of the movable body 10 is maintained in the range of the vehicle body region AR, in accordance with the quick turn mode, the movable body 10 moves toward the first travel direction while changing the orientation from the first travel direction to the second travel direction.

Note that in a case where it is the quick turn mode (special turn mode), at timing at which changing of the orientation of the movable body 10 to the targeted second travel direction has been completed, the movement control unit 56 returns the steering angle of each of the wheels 30 to 0°. Herein, 0° refers to an angle with which the orientation of each of the wheels 30 faces the second travel direction (the orientation of the movable body 10). In FIG. 5, an example of timing at which changing of the direction to the second travel direction (direction X) has been completed is illustrated by the movable body 10 topmost on the side in the direction Y. In the quick turn mode, up to timing immediately before the changing of the orientation of the movable body 10 to the second travel direction (direction X) has been completed, as indicated by a dashed line in the drawing of the movable body 10 topmost on the side in the direction Y in FIG. 5, each of the wheels 30 faces the direction to change the orientation of the movable body 10 and does not face the second travel direction side. However, in a case where even after the movable body 10 has faced the second travel direction, the orientation in which each of the wheels 30 has so far faced is maintained, the movable body 10 moves along the orientation of each of the wheels 30 by inertia and the movable body 10 faces a direction which is different from the second travel direction. In order to cope with this, in the present embodiment, as indicated by a solid line in the drawing of the movable body 10 topmost on the side in the direction Y in FIG. 5, matching the orientation of each of the wheels 30 with the second travel direction side at timing at which the movable body 10 has faced the second travel direction serves as a brake, thereby preventing the movable body 10 from facing the direction which is different from the second travel direction. Note that in the normal turn mode, since from timing at which the movable body 10 faces the first travel direction, the orientation of each of the wheels 30 is gradually changed to the second travel direction side and thereafter, the orientation of each of the wheels 30 is returned so as to be along the orientation of the movable body 10, the similar processing is unnecessary.

Control Flow

Figure 6:
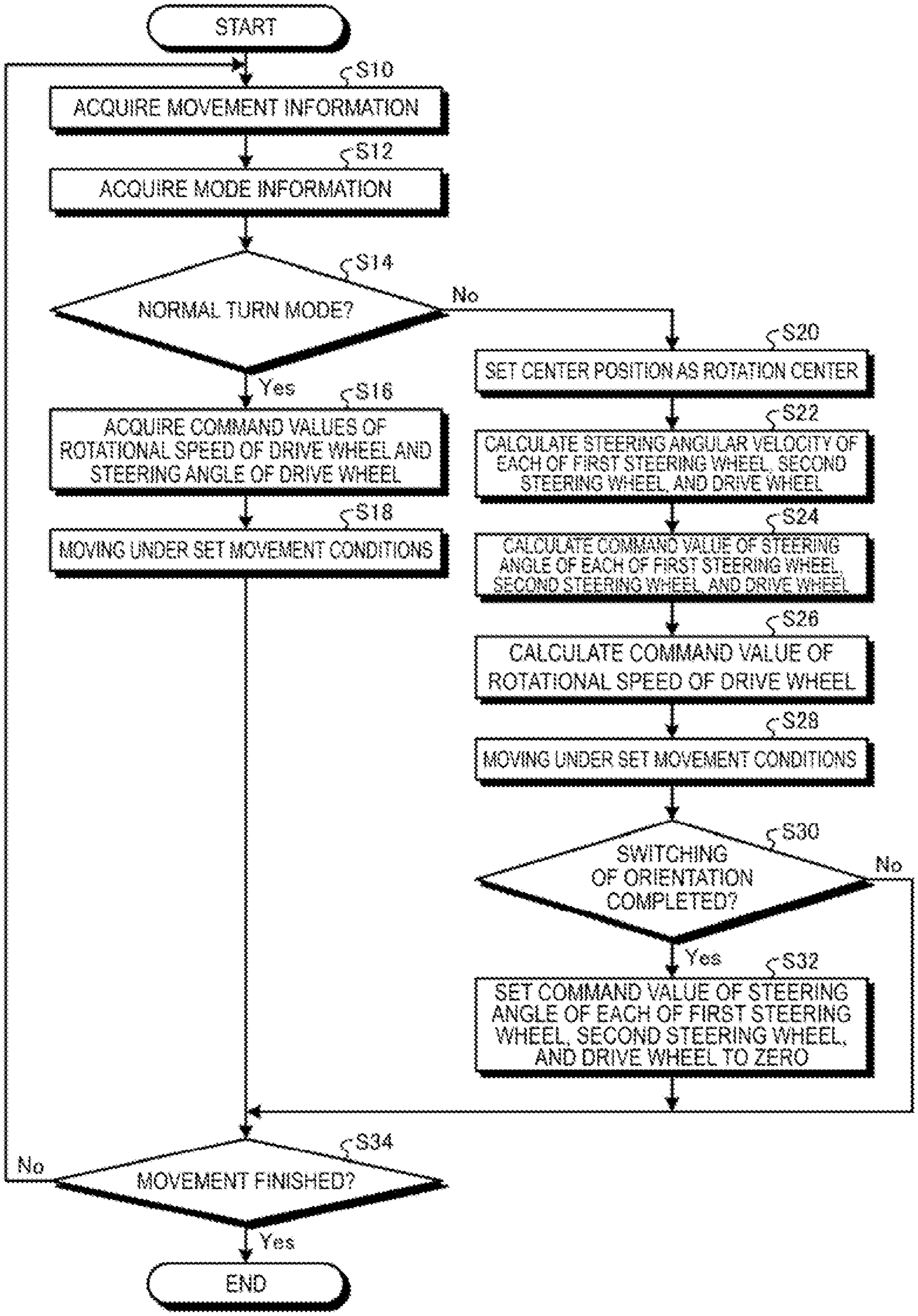
FIG. 6 is a flowchart explaining a control flow of a control device according to a first embodiment.

Next, a flow of the above-described control of the control device 28 will be described. FIG. 6 is a flowchart which explains the control flow of the control device according to the first embodiment. As illustrated in FIG. 6, the control device 28 acquires the movement information of the movable body 10 by the movement information acquisition unit 50 (step S10). The movement information acquisition unit 50 acquires, as the movement information, the information of target velocities Vx and Vy of the movable body 10 and a target angular velocity Ω of the movable body 10. In addition, the control device 28 acquires mode information by the mode information acquisition unit 52 (step S12). Note that processing order at steps S10 and S12 is any order.

In a case where the mode information indicates the normal turn mode (step S14; Yes), the control device 28 selects the normal turn mode, calculates, as movement conditions, a rotational speed command value and a steering angle command value of the drive wheel 30C based on the movement information by the movement condition setting unit 54 (step S16) and controls the wheels 30 under the calculated movement conditions by the movement control unit 56, thereby moving the movable body 10 (step S18).

On the other hand, in a case where the mode information does not indicate the normal turn mode (step S14; No), that is, in a case where the mode information indicates the quick turn mode, the control device 28 selects the quick turn mode, sets the center position among the wheels 30 as the rotation center P by the movement condition setting unit 54 (step S20), calculates a steering angular velocity ωi of each of the first steering wheel 30A, the second steering wheel 30B, and the drive wheel 30C based on the movement information (step S22), and calculates a steering angle command value θi of each of the first steering wheel 30A, the second steering wheel 30B, and the drive wheel 30C based on the steering angular velocity ωi (step S24). In addition, the movement condition setting unit 54 calculates the rotational speed command value $\omega_{dC}$ of the drive wheel 30C based on the movement information (step S26). Then, the control device 28 controls the wheels 30 by the movement control unit 56 under the calculated movement conditions, thereby moving the movable body 10 (step S28). Then, in a case where switching of the orientation of the movable body 10 has been completed (step S30; Yes), that is, in a case where the movable body 10 has faced the targeted second travel direction, the steering angle command value θi of each of the first steering wheel 30A, the second steering wheel 30B, and the drive wheel 30C is set to 0° (step S32). After execution of step S18, after execution of step S32, or in a case of No in step S30, the processing proceeds to step S34, in a case where the processing is not finished (step S34; No), the processing returns to step S10 and is continued, and in a case where the processing is finished (step S34; Yes), the present processing is finished.

Effect

As described above, the movable body 10 according to the present embodiment includes the first steering wheel 30A and the second steering wheel 30B, for which only steering can be made and the drive wheel 30C for which steering and driving can be made. Therefore, the movable body 10 of the present embodiment can change the orientation while moving, with an increase in the turn radius inhibited, as compared with, for example, a movable body in which only wheels on a front side are steerable and only wheels on a back side are drivable. In addition, since the movable body 10 of the present embodiment has only one drive wheel 30C, reduction in a weight of the whole movable body 10 and simplification of a structure thereof are enabled. In addition, a large-sized drive source can be mounted and driving power can also be enhanced. In addition, for example, although when there are a plurality of drive wheels, it is required to mutually synchronize the drive wheels, since in the present embodiment, there is one drive wheel 30C, such synchronization is not required. Therefore, the movable body 10 of the present embodiment having a simple configuration enables appropriate turning. In addition, since the movable body 10 of the present embodiment automatically moves in a remote or autonomous manner, unlike a movable body which is directly operated by a worker in a manual manner, the wheels 30 can be appropriately operated in such a way that steering angles and driving of the wheels 30 are linked to one another. In addition, since the movable body 10 of the present embodiment can change the orientation while moving, turning without stopping is enabled, thereby allowing traveling time to be shortened and acceleration and deceleration to be reduced.

In addition, the movable body 10 according to the present embodiment can perform switching between the normal turn mode and the quick turn mode. Therefore, for example, by using the quick turn mode, when changing the orientation while moving, an increase in the turn radius can be inhibited. Therefore, it is possible to make a passage small, through which the movable body 10 travels, thereby increasing a space for a shelf and goods.

Note that although in the description given hereinbefore, the control device 28 of the movable body 10 acquires the movement conditions and the mode information and, based on these, sets the movement conditions, setting of the movement conditions is not limited to the setting made by the control device 28. For example, other apparatus may set the movement conditions based on the movement conditions and the mode information, the control device 28 may acquire the information of the movement conditions from the apparatus and, based on the acquired movement conditions, may control the movement of the movable body 10.

Second Embodiment

Next, a second embodiment will be described. The second embodiment is different from the first embodiment in that as a special turn mode, a pivot turn mode is included. Parts of the second embodiment with configurations that are the same as those in the first embodiment will not be described.

Pivot Turn Mode

Figure 7:
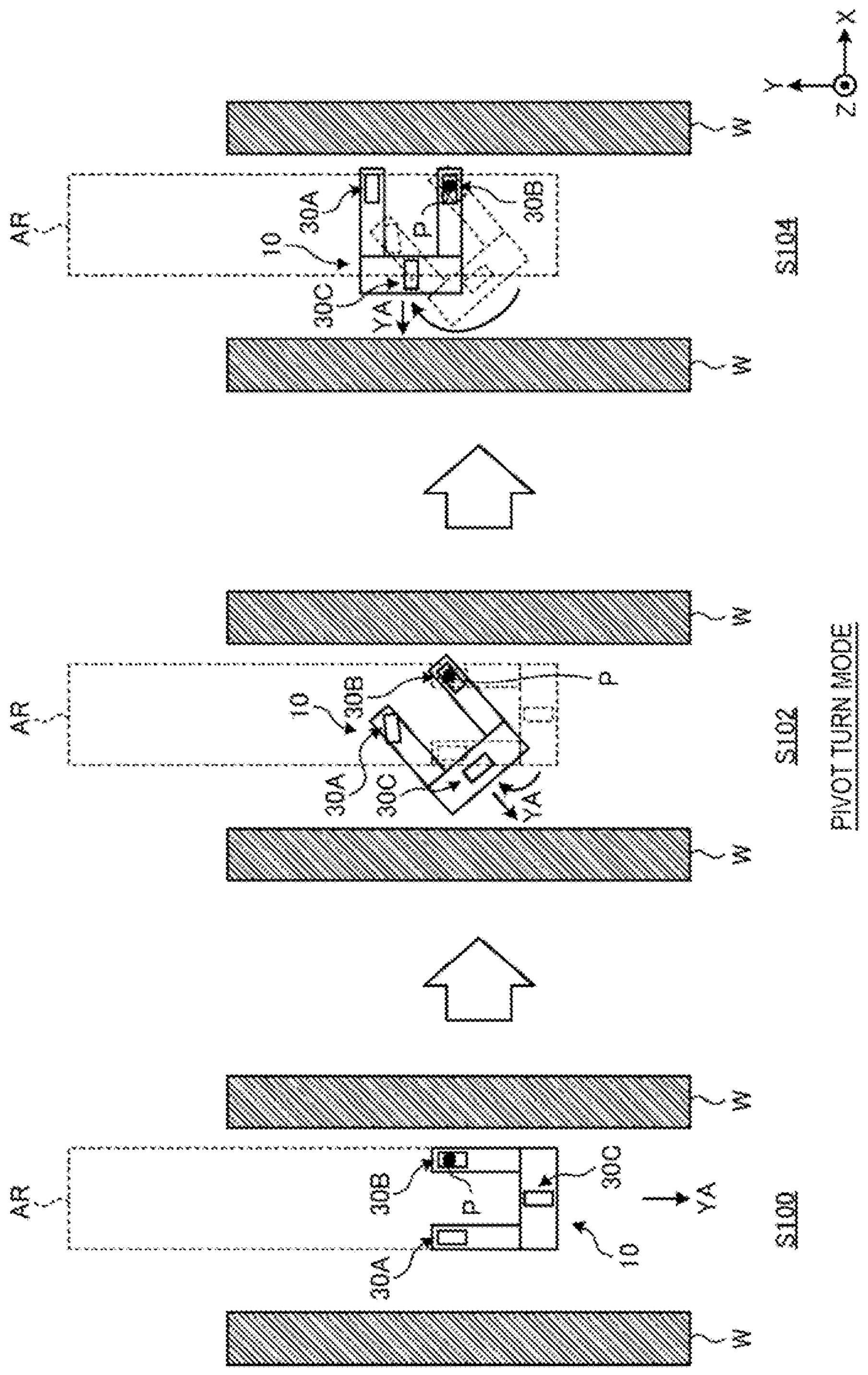
FIG. 7 is a schematic view illustrating an example of a pivot turn mode.

FIG. 7 is a schematic view illustrating an example of the pivot turn mode. In the second embodiment, as the special turn mode, the pivot turn mode is included. The pivot turn mode is a mode in which a movable body 10 is moved such that viewed from a direction Z, the rotation center P of the movable body 10 is a position of the first steering wheel 30A or a position of the second steering wheel 30B. As illustrated in steps S100, S102, and S104 in FIG. 7, in a quick turn mode, all of wheels 30 are steered while a drive wheel 30C is being driven, and an orientation of the movable body 10 is switched from a first travel direction (herein, a direction Y) to a second travel direction (herein, an X direction) while the rotation center P which is the position of the first steering wheel 30A or the position of the second steering wheel 30B is located within a range of the vehicle body region AR. Note that FIG. 7 illustrates an example in a case where the second steering wheel 30B is the rotation center P.

Setting of Movement Conditions in Pivot Turn Mode

In a case where mode information indicates the pivot turn mode, based on the movement information acquired by the movement information acquisition unit 50, under conditions of the pivot turn mode, the movement condition setting unit 54 sets, as movement conditions, a rotational speed command value of the drive wheel 30C and a steering angle command value of each of the wheels 30. In a case of having acquired, as the mode information, information indicating that the first steering wheel 30A is the rotation center P, the movement condition setting unit 54 sets a position of the first steering wheel 30A as the rotation center P, and in a case of having acquired information indicating that the second steering wheel 30B is the rotation center P, the movement condition setting unit 54 sets a position of the second steering wheel 30B as the rotation center P. Since subsequent processes of the movement condition setting unit 54 are similar to those in the quick turn mode in the first embodiment, description therefor is omitted.

In a case where it is the pivot turn mode, the movement control unit 56 controls a rotational speed of a drive wheel 30C and a steering angle of each of the wheels 30 such that the rotational speed command value $\omega_{dC}$ of the drive wheel 30C and a steering angle command value θi of each of the wheels 30, set by the movement condition setting unit 54, are attained. Thus, in accordance with the pivot turn mode, while a position of the rotation center P of the movable body 10 is maintained within the range of the vehicle body region AR, without moving in a translatory manner, the movable body 10 moves so as to change the orientation of the movable body 10 from the first travel direction to the second travel direction, with the first steering wheel 30A or the second steering wheel 30B as the rotation center. Note that also in the pivot turn mode, the movable body 10 may move in a translatory manner while changing the orientation from the first travel direction to the second travel direction.

Control Flow

Figure 8:
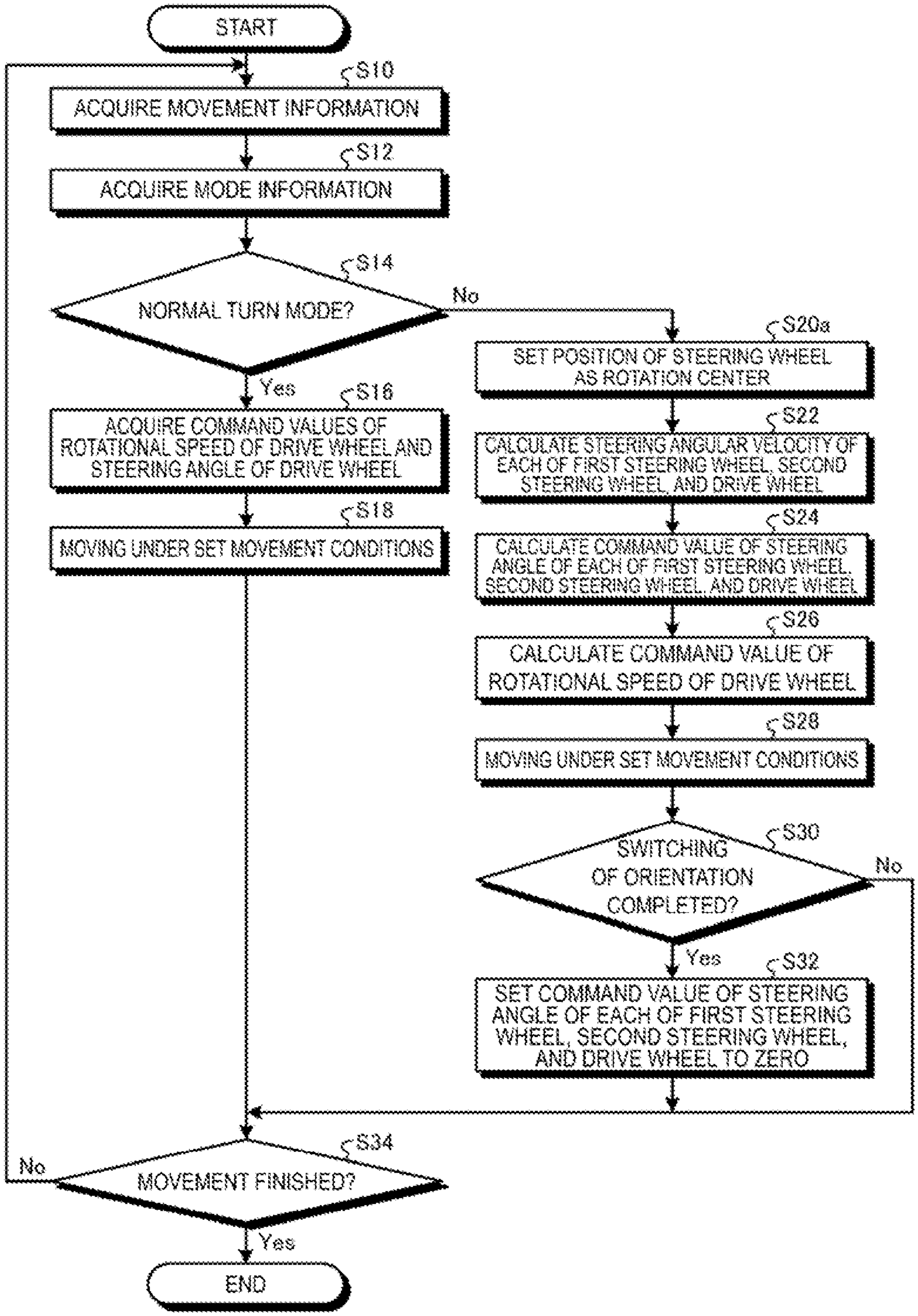
FIG. 8 is a flowchart explaining a control flow of a control device according to a second embodiment.

Next, a control flow of the second embodiment will be described. FIG. 8 is a flowchart which explains the control flow of the control device according to the second embodiment. As illustrated in FIG. 8, processes in steps S10 and S12 are similar to those in the first embodiment. In addition, in a case where the mode information indicates a normal turn mode (step S14; Yes), processes in subsequent steps S16 and S18 are also similar to those in the first embodiment. On the other hand, in a case where the mode information does not indicate the normal turn mode (step S14; No), that is, in a case of indicating the pivot turn mode, the control device 28 selects the pivot turn mode, the movement condition setting unit 54 sets the position of the first steering wheel 30A or the position of the second steering wheel 30B as the rotation center P (step S20*a*). Since subsequent processes are similar to those in the first embodiment, description therefor is omitted.

Effect

As in the second embodiment, by making the pivot turn mode selectable, for example, also in a narrow passage, it is made possible to appropriately change the orientation. In particular, for example, as illustrated in FIG. 7, in a case where it is required to travel on one side (a right side in an example in FIG. 7) in accordance with standards, the pivot turn is effective. In other words, as in the example in FIG. 7, in a case of traveling on the right side and it is desired to approach goods on a shelf W on the right side of a passage, it is required to change the orientation to the right side. However, for example, in a case where the quick turn mode is selected in order to change the orientation to the right side, since a distance to the shelf W on the right side is short, the movable body interferes with the shelf W on the right side, or a procedure of moving away once from the shelf W on the right side and then approaching the shelf W is required. In order to cope with this, by changing the orientation to the right side in the pivot turn with the second steering wheel 30B on the right side as the rotation center, a need to protrude toward the right side is suitably inhibited and it is made possible to directly approach the shelf W on the right side without interfering with the shelf W on the right side.

Note that the second embodiment may be combined with the first embodiment. In other words, the control device 28 may acquire mode information indicating that any of the normal turn mode, the quick turn mode, and the pivot turn mode is used, may set movement conditions of the movable body 10 in the mode indicated by the mode information, and may move the movable body 10.

Third Embodiment

Next, a third embodiment will be described. The third embodiment is different from the first embodiment in that as a special turn mode, an optional turn mode is included. Parts of the second embodiment with configurations that are the same as those in the first embodiment will not be described.

Optional Turn Mode

In the third embodiment, as the special turn mode, the optional turn mode is included. The optional turn mode is a mode in which viewed from a direction Z, a designated position is set as the rotation center P of the movable body 10. The designated position may be appropriately set. In a case of the optional turn mode, information indicating the designated position is included in mode information.

Setting of Movement Conditions in Optional Turn Mode

In a case where the mode information indicates the optional turn mode, the movement condition setting unit 54 acquires the information of the designated position included in the mode information, specifies the designated position based on the information of the designated position, and sets the specified designated position as the rotation center P. In a case where the information of the designated position indicates a coordinate of the designated position, the movement condition setting unit 54 sets the designated position as the rotation center P. On the other hand, in a case where the information of the designated position does not indicate the coordinate of the designated position itself, the movement condition setting unit 54 may acquire the coordinate of the designated position based on the information of the designated position. For example, in a case where the information of the designated position is information indicating that the designated position is a position of a center of gravity of the movable body 10, the movement condition setting unit 54 acquires the information of the coordinate of the position of the center of gravity of the movable body 10 and sets the information of the coordinate as a coordinate of the designated position. A method of acquiring the coordinate of the position of the center of gravity of the movable body 10 by the movement condition setting unit 54 is any method, the coordinate of the position of the center of gravity of the movable body 10 may be previously set or may be calculated by the movement condition setting unit 54. In addition, for example, a position of a center of gravity in a case where the movable body 10 and a loaded object are combined may be set as the designated position.

After the movement condition setting unit 54 has set the designated position as the rotation center P, the movement condition setting unit 54 sets movement conditions based on the movement information under conditions of the optional turn mode. Since subsequent processes of the movement condition setting unit 54 are similar to those in the quick turn mode in the first embodiment, description therefor is omitted.

In a case where it is the optional turn mode, the movement control unit 56 controls a rotational speed of a drive wheel 30C and a steering angle of each of wheels 30 such that the rotational speed command value $\omega_{dC}$ of the drive wheel 30C and the steering angle command value θi for each of the wheels 30, set by the movement condition setting unit 54, are attained. Thus, in accordance with the optional turn mode, while the position of the rotation center P of the movable body 10 is maintained within a range of the vehicle body region AR, the movable body 10 moves with the designated position as a rotation center so as to change the orientation from the first travel direction to the second travel direction.

Control Flow

Figure 9:
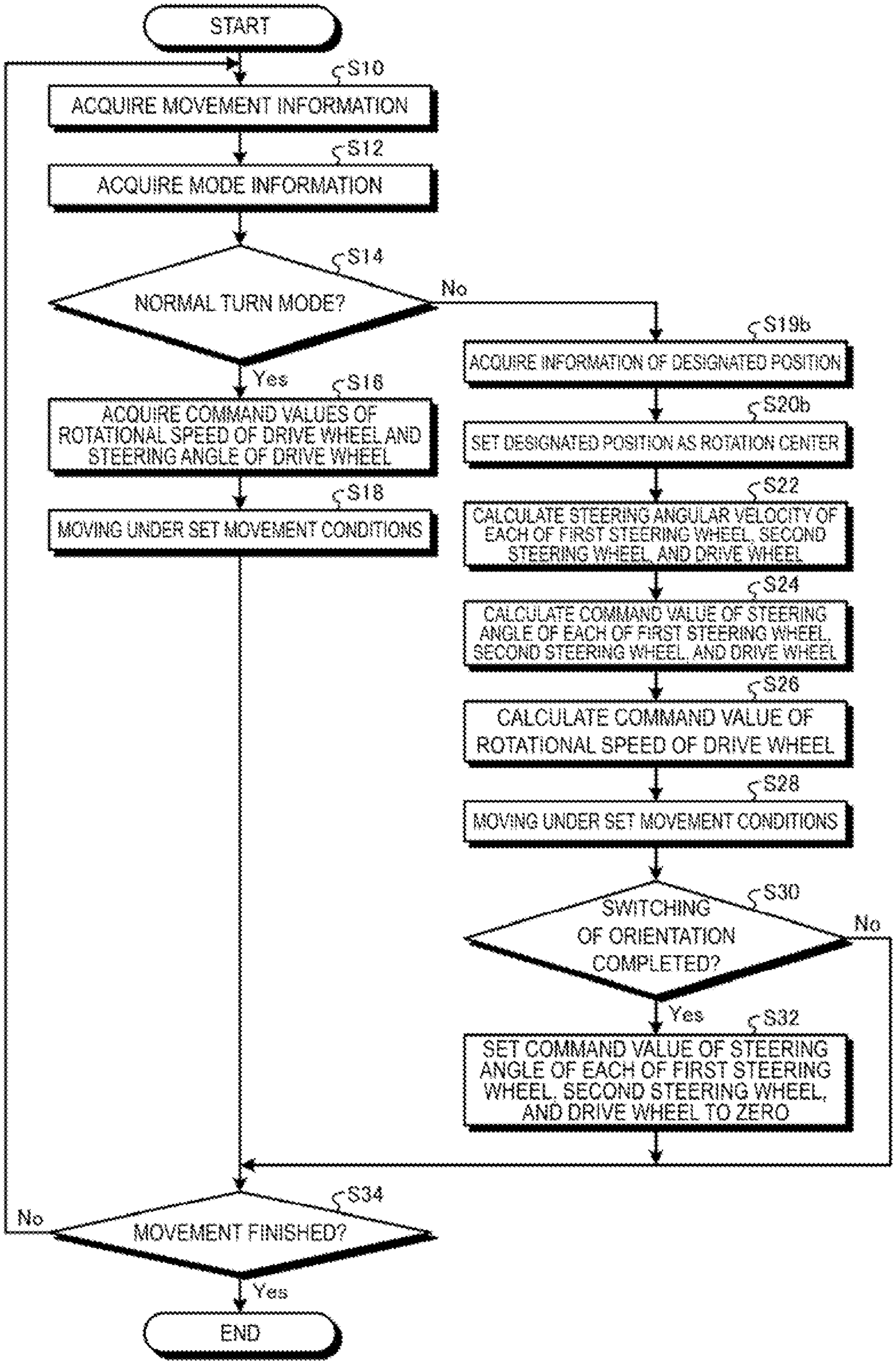
FIG. 9 is a flowchart explaining a control flow of a control device according to a third embodiment.

Next, a control flow of the third embodiment will be described. FIG. 9 is a flowchart which explains the control flow of a control device according to the third embodiment. As illustrated in FIG. 9, processes in steps S10 and S12 are similar to those in the first embodiment. In addition, in a case where the mode information indicates a normal turn mode (step S14; Yes), processes in subsequent steps S16 and S18 are also similar to those in the first embodiment. On the other hand, in a case where the mode information does not indicate the normal turn mode (step S14; No), that is, in a case of indicating the optional turn mode, the control device 28 selects the optional turn mode, acquires the information of the designated position by the movement condition setting unit 54 (step S19*b*), and sets the designated position as the rotation center P (step S20*b*). Since subsequent processes are similar to those in the first embodiment, description therefor is omitted.

Effect

As in the third embodiment, by making the optional turn mode selectable, the rotation center P can be set in accordance with circumstances and it is made possible to appropriately turn with a simple configuration. For example, the position of the center of gravity is set as the rotation center P, thereby inhibiting centrifugal force from being increased and enabling stable turning.

Note that the third embodiment may be combined with the first embodiment and the second embodiment. In other words, the control device 28 may acquire mode information indicating that any of the normal turn mode, the quick turn mode, and the optional turn mode is used, may set movement conditions of the movable body 10 in the mode indicated by the mode information, and may move the movable body 10. In addition, the control device 28 may acquire mode information indicating that any of the normal turn mode, the pivot turn mode, and the optional turn mode is used, may set movement conditions of the movable body 10 in the mode indicated by the mode information, and may move the movable body 10. In addition, the control device 28 may acquire mode information indicating that any of the normal turn mode, the quick turn mode, the pivot turn mode, and the optional turn mode is used, may set movement conditions of the movable body 10 in the mode indicated by the mode information, and may move the movable body 10.

Effect of the Present Disclosure

As described hereinbefore, the movable body 10 of the present disclosure is a tricyclic movable body which automatically moves and includes the first steering wheel 30A which is steerable but not drivable, the second steering wheel 30B which is steerable but not drivable and provided on the first direction (the direction opposite to the direction XA) side with respect to the first steering wheel 30A, and the drive wheel 30C which is steerable and drivable and provided on the side in the second direction (direction YA) orthogonal to the first direction with respect to the first steering wheel 30A and the second steering wheel 30Bn. This movable body 10 of the present embodiment can travel in a manner protruding to a side to which the orientation is changed upon turning, as compared with, for example, a movable body in which only wheels on a front side are steerable and only wheels on a back side are drivable, thereby inhibiting a turn radius from being increased and allowing the orientation to be changed while moving. In addition, since in the movable body 10 of the present embodiment, one drive wheel 30C is included, a configuration of the movable body 10 is made simple. As described above, the movable body 10 of the present embodiment enables appropriate turning with the simple configuration.

The movable body 10 of the present disclosure further includes the control unit 44 which controls the movement of the movable body 10 by controlling the steering of at least one of the first steering wheel 30A, the second steering wheel 30B, and the drive wheel 30C and the driving of the drive wheel 30C. The control unit 44 acquires the mode information indicating whether it is the normal turn mode or the special turn mode. The normal turn mode is the movement mode in which when the movable body 10 moves while changing the orientation from the first travel direction to the second travel direction, viewed from the vertical direction, the movable body 10 is moved while permitting the rotation center P of the movable body 10 being out of the vehicle body region AR in which the region occupied by the movable body 10 is extended along the first travel direction. The special turn mode is the movement mode in which when the movable body 10 moves while changing the orientation from the first travel direction to the second travel direction, viewed from the vertical direction, the movable body 10 is moved with the rotation center P of the movable body 10 being located within the vehicle body region AR. The control unit 44 moves the movable body 10 in the mode indicated by the mode information while changing the orientation. In a case where for example, a passage is narrow, by employing the movable body 10 of the present embodiment, switching between the normal turn mode and the special turn mode can be made, thereby allowing the special turn mode to be selected and enabling appropriate turning with a simple configuration.

The special turn mode includes the quick turn mode in which the movable body 10 is moved such that the rotation center P of the movable body 10 is the center position among the first steering wheel 30A, the second steering wheel 30B, and the drive wheel 30C, viewed from the vertical direction. By employing the movable body 10 of the present embodiment, the quick turn mode can be used, thereby inhibiting a turn radius from being increased and allowing appropriate turning with a simple configuration.

The special turn mode includes the pivot turn mode in which the movable body 10 is moved such that the rotation center P of the movable body 10 is the position of the first steering wheel 30A or the second steering wheel 30B, viewed from the vertical direction. By employing the movable body 10 of the present embodiment, the pivot turn mode can be used, thereby enabling appropriate turning in accordance with circumstances.

The special turn mode includes the optional turn mode in which the movable body 10 is moved such that, the rotation center P of the movable body 10 is the designated position, viewed from the vertical direction. In a case where the mode information indicates the optional turn mode, the control unit 44 acquires the information of the designated position and moves the movable body 10 in the optional turn mode while changing the orientation such that the designated position is the rotation center P. By employing the movable body 10 of the present embodiment, the optional turn mode can be used, thereby enabling appropriate turning in accordance with circumstances.

In the special turn mode, after the orientation of the movable body 10 has been switched to the second travel direction, the control unit 44 switches steering angles of the first steering wheel 30A, the second steering wheel 30B, and the drive wheel 30C so as to make directions of the first steering wheel 30A, the second steering wheel 30B, and the drive wheel 30C follow the second travel direction. There may be a case where in the special turn mode, the orientation of the movable body 10 faces a direction other than the second travel direction at timing at which the direction is switched to the second travel direction, it is likely that the orientation of the movable body 10 is deviated. In order to cope with this, making the directions of the first steering wheel 30A, the second steering wheel 30B, and the drive wheel 30C follow the second travel direction serves as a brake, thereby preventing the deviation of the orientation of the movable body 10.

The movable body 10 is a forklift which automatically moves. The present movable body 10 can appropriately function as the forklift.

The control method of the present disclosure controls the movable body 10 which is the tricyclic movable body automatically moving and includes the first steering wheel 30A which is steerable but not drivable, the second steering wheel 30B which is steerable but not drivable and provided on the side in the first direction (the direction opposite to the direction XA) side with respect to the first steering wheel 30A, and the drive wheel 30C which is steerable and drivable and provided on the side in the second direction (direction YA) orthogonal to the first direction with respect to the first steering wheel 30A and the second steering wheel 30B. The present control method includes a step of acquiring the mode information indicating whether selected is the normal turn mode or the special turn mode and a step of moving, by controlling the steering of at least one of the first steering wheel 30A, the second steering wheel 30B, and the drive wheel 30C and by controlling the driving of the drive wheel 30C, the movable body 10 in the mode indicated by the mode information while changing the orientation. According to the present control method, it is made possible to appropriately turn the movable body 10 with a simple configuration.

A non-transitory computer readable storage medium storing a program of the present disclosure causes a computer to execute a method for controlling the movable body 10 which is the tricyclic movable body automatically moving and includes the first steering wheel 30A which is steerable but not drivable, the second steering wheel 30B which is steerable but not drivable and provided on the side in the first direction (the direction opposite to the direction XA) side with respect to the first steering wheel 30A, and the drive wheel 30C which is steerable and drivable and provided on the side in the second direction (direction YA) orthogonal to the first direction with respect to the first steering wheel 30A and the second steering wheel 30B. The present non-transitory computer readable storage medium storing the program causes the computer to execute a step of acquiring the mode information indicating whether selected is the normal turn mode or the special turn mode and a step of moving, by controlling the steering of at least one of the first steering wheel 30A, the second steering wheel 30B, and the drive wheel 30C and by controlling the driving of the drive wheel 30C, the movable body 10 in the mode indicated by the mode information while changing the orientation. According to the present program, it is made possible to appropriately turn the movable body 10 with a simple configuration.

The embodiment of the disclosure is described above, but the embodiment is not limited by the details of the embodiment above. Further, the constituent elements of the above-described embodiment include elements that are able to be easily conceived by a person skilled in the art, and elements that are substantially the same, that is, elements of an equivalent scope. Furthermore, the constituent elements described above can be appropriately combined. Further, it is possible to make various omissions, substitutions, and changes to the constituent elements within a range not departing from the scope of the above-described embodiment.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A movable body which is a tricyclic movable body automatically moving, the movable body comprising:

a first steering wheel configured to be steerable but not drivable;

a second steering wheel configured to be steerable but not drivable, the second steering wheel being on a side in a first direction with respect to the first steering wheel;

a drive wheel configured to be steerable and drivable, the drive wheel being provided on a side in a second direction orthogonal to the first direction with respect to the first steering wheel and the second steering wheel; and a control unit configured to control movement of the movable body by controlling steering of at least one of the first steering wheel, the second steering wheel, and the drive wheel, and by controlling driving of the drive wheel, wherein the control unit is configured to, when the movable body moves while changing an orientation from a first travel direction to a second travel direction as viewed from a vertical direction, acquire mode information indicating whether selected is a normal turn mode in which the movable body is moved while permitting a rotation center of the movable body to be out of a vehicle body region, the vehicle body region being defined as a region extending along the first travel direction and occupied by the movable body, or a special turn mode in which the movable body is moved with the rotation center of the movable body located within the vehicle body region, wherein the control unit is configured to move the movable body in a mode indicated by the mode information while changing the orientation, and wherein the special turn mode comprises a pivot turn mode in which the movable body is moved such that the rotation center of the movable body is a position of the first steering wheel or the second steering wheel as viewed from the vertical direction.

2. The movable body according to claim 1, wherein the special turn mode comprises a quick turn mode in which the movable body is moved such that the rotation center of the movable body is a center position among the first steering wheel, the second steering wheel, and the drive wheel as viewed from the vertical direction.

3. The movable body according to claim 1, wherein;

the special turn mode comprises an optional turn mode in which the movable body is moved such that the rotation center of the movable body is a designated position as viewed from the vertical direction, and in a case where the mode information indicates the optional turn mode, the control unit acquires information of the designated position and moves the movable body in the optional turn mode while changing the orientation such that the designated position is the rotation center.

4. The movable body according to claim 1, wherein the control unit is further configured such that, in the special turn mode, after the orientation of the movable body has been switched to the second travel direction, the control unit switches steering angles of the first steering wheel, the second steering wheel, and the drive wheel so as to make directions of the first steering wheel, the second steering wheel, and the drive wheel follow the second travel direction.

5. The movable body according to claim 1, wherein the movable body is a forklift which automatically moves.

6. A method for controlling a movable body which is a tricyclic movable body automatically moving and comprises a first steering wheel steerable but not drivable, a second steering wheel steerable but not drivable and provided on a side in a first direction with respect to the first steering wheel, and a drive wheel steerable and drivable and provided on a side in a second direction orthogonal to the first direction with respect to the first steering wheel and the second steering wheel, the method comprising:

acquiring, when the movable body moves while changing an orientation from a first travel direction to a second travel direction as viewed from a vertical direction, mode information indicating whether selected is a normal turn mode in which the movable body is moved while permitting a rotation center of the movable body being out of a vehicle body region, the vehicle body region being defined as a region extending along the first travel direction and occupied by the movable body, or a special turn mode in which the movable body is moved with the rotation center of the movable body being located within the vehicle body region;

moving the movable body in a mode indicated by the mode information while changing the orientation by controlling steering of at least one of the first steering wheel, the second steering wheel, and the drive wheel and by controlling driving of the drive wheel;

wherein the special turn mode comprises a pivot turn mode of moving the movable body such that the rotation center of the movable body is a position of the first steering wheel or the second steering wheel as viewed from the vertical direction.

7. A non-transitory computer readable storage medium storing a program which causes a computer to execute a method for controlling a movable body which is a tricyclic movable body automatically moving and comprises a first steering wheel which is steerable but not drivable, a second steering wheel which is steerable but not drivable and provided on a side in a first direction with respect to the first steering wheel, and a drive wheel which is steerable and drivable and provided on a side in a second direction orthogonal to the first direction with respect to the first steering wheel and the second steering wheel, the non-transitory computer readable storage medium storing the program causing the computer to:

acquire, when the movable body is moved while changing an orientation from a first travel direction to a second travel direction, viewed from a vertical direction, mode information indicating whether selected is a normal turn mode in which the movable body is moved while permitting a rotation center of the movable body being out of a vehicle body region, the vehicle body region being defined as a region extending along the first travel direction and occupied by the movable body, or a special turn mode in which the movable body is moved with the rotation center of the movable body being located within the vehicle body region; and move the movable body in a mode indicated by the mode information while changing the orientation, by controlling steering of at least one of the first steering wheel, the second steering wheel, and the drive wheel and by controlling driving of the drive wheel;

wherein the special turn mode comprises a pivot turn mode of moving the movable body such that the rotation center of the movable body is a position of the first steering wheel or the second steering wheel as viewed from the vertical direction.

* * * * *